(12) United States Patent
Sasaki et al.

(10) Patent No.: US 7,911,951 B2
(45) Date of Patent: Mar. 22, 2011

(54) BEST-EFFORT BANDWIDTH ALLOCATING METHOD AND DEVICE

(75) Inventors: Hiroyuki Sasaki, Kawasaki (JP); Masayuki Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 352 days.

(21) Appl. No.: 11/878,911

(22) Filed: Jul. 27, 2007

(65) Prior Publication Data

US 2008/0080377 A1  Apr. 3, 2008

(30) Foreign Application Priority Data

Sep. 28, 2006 (JP) ................................ 2006-263765

(51) Int. Cl.
*G01R 31/08* (2006.01)
(52) U.S. Cl. .................................. 370/233; 370/395.41
(58) Field of Classification Search .............. 370/230.1, 370/233, 235.1, 253, 395.21, 395.41, 463, 370/468; 709/229; 398/72
See application file for complete search history.

(56) References Cited

U.S. PATENT DOCUMENTS

| | | | |
|---|---|---|---|
| 5,225,922 A | | 7/1993 | Chraplyvy et al. |
| 6,408,005 B1 | | 6/2002 | Fan et al. |
| 7,197,244 B2 * | | 3/2007 | Thomas et al. ............... 398/72 |
| 2001/0018711 A1 * | | 8/2001 | Morris ........................... 709/229 |
| 2003/0123390 A1 * | | 7/2003 | Takase et al. ............... 370/230.1 |
| 2009/0097407 A1 * | | 4/2009 | Buskirk et al. ............. 370/235.1 |

FOREIGN PATENT DOCUMENTS

| | | |
|---|---|---|
| JP | 6-69891 | 3/1994 |
| JP | 11-098155 A | 4/1999 |
| JP | 2002-261814 | 9/2002 |
| JP | 2002-261814 A | 9/2002 |
| JP | 2002-344500 A | 11/2002 |

OTHER PUBLICATIONS

"Japanese Office Action" mailed by JPO and corresponding to Japanese application No. 2006-263765 on Nov. 2, 2010, with partial English translation.

* cited by examiner

*Primary Examiner* — Seema S Rao
*Assistant Examiner* — Leon Andrews
(74) *Attorney, Agent, or Firm* — Fujitsu Patent Center

(57) ABSTRACT

A method is disclosed including: measuring sending amounts of packet data that are input from each of ports providing minimum bandwidth guarantee type and best-effort type communication service; calculating statistical information corresponding to an accounting subject time period of the sending amounts of the packet data of the best-effort bandwidth of each of the ports, based on the result of the measurement; changing a value of a peak information rate of a port sending out more of the packet data at a contracted communication rate to be low based on the statistical information; and impartially allocating the best-effort bandwidth to each of the ports based on the value of the peak information rate and a minimum bandwidth guarantee rate.

4 Claims, 5 Drawing Sheets

BEST-EFFORT BANDWIDTH ALLOCATING METHOD AND DEVICE

BACKGROUND OF THE INVENTION

1. Field of the Invention

The present invention generally relates to best-effort bandwidth allocating methods and devices, and more specifically, to a best-effort bandwidth allocating method and device whereby, in a case where a best-effort bandwidth in a layer 2 network impartially allocated to each of end users or minimum bandwidth guarantee service is provided in a network of a communication carrier, the best-effort bandwidth is allocated based on a contract money of each of the end users.

2. Description of the Related Art

Conventionally, in Wide Area Ethernet® communications, a minimum bandwidth guarantee type service wherein a contract bandwidth is allocated to an end user (hereinafter, "user") has been a main communication service. However, in an ATM (Asynchronous Transfer Mode) communications environment, in addition to the minimum bandwidth guarantee type service, there is a bandwidth guarantee and best-effort service where the minimum bandwidth guarantee type service and the best-effort bandwidth type service are combined. Hence, there is demand to perform this bandwidth guarantee and best-effort service in Wide Area Ethernet (registered trademark) communications.

In a case where the bandwidth guarantee and best-effort service is performed in the Wide Area Ethernet (registered trademark) communications, it is a problem that the best-effort bandwidth greater than the bandwidth guarantee may not be impartially allocated to each of the users. The reason why the best-effort bandwidth greater than the bandwidth guarantee may not be impartially allocated to each of the users is that the packet data of a specific heavy user, namely a user sending more data, can easily surpass the best-effort bandwidth.

A method for impartially allocating best-effort bandwidth in a layer 3 network is discussed in, for example, Japanese Laid-Open Patent Application Publication No. 2002-261814, and others.

The method discussed in Japanese Laid-Open Patent Application Publication No. 2002-261814 is a priority control method. That is, CTR (Committed Target Rate) and PTR (Peak Target Rat) are used as parameters in an edge router and an average rate of data traffic sent by the user is measured. Based on the average rate, data of the user less than the CTR are marked in green; data of the user equal to or greater than the CTR but less than the PTR are marked in yellow; and data of the user equal to or greater than the PTR are marked in red. The data are discarded in a core router based on a discard ratio corresponding to each of the markings.

In a case of the minimum bandwidth guarantee transferring service, in order to ease partiality of excess bandwidth allocation due to the difference of the flow numbers, the flow number multiplexed for an event profile is measured and a threshold value such as the CTR (Committed Target Rate) is changed based on a ratio of the inverse of the measured flow number.

The characteristic in the bandwidth guarantee and best-effort service, where the packet data of the user sending more data more can easily surpass the best-effort bandwidth, is discussed with reference to FIG. 1. Here, FIG. 1 is a view showing an output rate of a related art bandwidth guarantee and best-effort service. The bandwidth guarantee is a CIR (Committed Information Rate). The best-effort bandwidth is balanced between the PIR (Peak Information Rate) and the CIR (Committed Information Rate), namely "PIR-CIR".

As shown in FIG. 1(a), it is assumed that the CIR (Committed Information Rate) and the PIR (Peak Information Rate) of each of the users A, B, and C is the same as the others; and each of the users A, B, and C makes a contract where the CIR (Committed Information Rate) is 5 Mbps and the PIR (Peak Information Rate) is 10 Mbps with a communications carrier. In other words, the minimum bandwidth guarantee rate of each of the users A, B, and C is the same as the others; and the useable bandwidth of the best-effort service of each of the users A, B, and C is the same as the others.

It is assume that data are sent from the user A (port #1) at 8 Mbps; data are sent from the user B (port #2) at 10 Mbps; and data are sent from the user C (port #3) at 7 Mbps; so that these data are gathered and data are output from the port #4 at 20 Mbps. The input rate of all of the data is 25 (=8+10+7) Mbps and data of 5 (=25−20) Mbps are discarded by a shaper function.

Packet data passing without being discarded by the shaper function of the port #4 are processed in the arriving order so as to be output. Therefore, an output rate of the user A is 6.4 Mbps (=8 Mbps×(20 Mbps÷25 Mbps)); an output rate of the user B is 8 Mbps (=10 Mbps×(20 Mbps÷25 Mbps)); and an output rate of the user C is 5.6 Mbps (=7 Mbps×(20 Mbps÷25 Mbps)). See FIG. 1(b).

Since each of the users A, B, and C pays the same amount of contract money under the same conditions for the CIR (Committed Information Rate) and the PIR (Peak Information Rate), the best-effort bandwidth of each of the users A, B, and C should be the same 6.66 Mbps. However, the user sending out the most data can use the best-effort bandwidth more than the user A and the user C. Hence, partiality in that the user sending the most data can use the bandwidth more may be generated.

Furthermore, in the related art impartial control of bandwidth allocation discussed in Japanese Laid-Open Patent Application Publication No. 2002-261814, bandwidth allocation is controlled based on the result of measurement of the arrived number of packets (TCP flow number) for a micro time period such as a Time Sliding Window. Hence, if the data traffic communication ratio of each of the users is measured at a span such as one month that is an accounting subject time period, the best effort bandwidth is not impartially distributed to the users even if the contents of contracts of the users are the same.

SUMMARY OF THE INVENTION

Accordingly, embodiments of the present invention may provide a novel and useful best-effort bandwidth allocating method and device solving one or more of the problems discussed above.

More specifically, the embodiments of the present invention may provide a best-effort bandwidth allocating method and device whereby the number of discarded packets of the user sending a larger amount of data based on a contracted communication rate is increased so that packets of other users can easily pass and an impartial best-effort bandwidth corresponding to the contracted communication rate can be allocated.

One aspect of the present invention may be to provide a best-effort bandwidth allocating method, including the steps of: measuring sending amounts of packet data that are input from each of ports providing minimum bandwidth guarantee type and best-effort type communication service; calculating statistical information corresponding to an accounting subject time period of the sending amounts of the packet data of the best-effort bandwidth of each of the ports, based on the result of the measurement; changing a value of a peak information rate of a port sending out more of the packet data at a contracted communication rate to be low based on the statistical information; and impartially allocating the best-effort bandwidth to each of the ports based on the value of the peak information rate and a minimum bandwidth guarantee rate.

Another aspect of the present invention may be to provide a best-effort bandwidth allocating device, including: a statistical information obtaining part configured to measure sending amounts of packet data that are input from each of ports providing minimum band-width guarantee type and best-effort type communication service, and to calculate statistical information corresponding to an accounting subject time period of the sending amounts of the packet data of the best-effort bandwidth of each of the ports, based on the result of the measurement; a policer setting part configured to change a value of a peak information rate of a port sending out more of the packet data at a contracted communication rate to be low based on the statistical information; and a policer function and a shaper function configured to impartially allocate the best-effort bandwidth to each of the ports based on the value of the peak information rate and a minimum bandwidth guarantee rate.

Other aspect of the present invention may be to provide a best-effort bandwidth allocating device, including: a statistical information obtaining part configured to measure sending amounts of packet data that are input from each of ports providing minimum bandwidth guarantee type and best-effort type communication service, and to calculate statistical information corresponding to an accounting subject time period of the sending amounts of the packet data of the best-effort bandwidth of each of the ports, based on the result of the measurement; a policer setting part configured to change a value of a peak burst size of a port sending out more of the packet data at a contracted communication rate to be low based on the statistical information; and a policer function and a shaper function configured to impartially allocate the best-effort bandwidth to each of the ports based on a value of the peak information rate and a minimum bandwidth guarantee rate.

Other aspect of the present invention may be to provide a best-effort bandwidth allocating device, including: a statistical information obtaining part configured to measure sending amounts of packet data that are input from each of ports providing minimum bandwidth guarantee type and best-effort type communication service, and to calculate statistical information corresponding to an accounting subject time period of the sending amounts of the packet data of the best-effort bandwidth of each of the ports, based on the result of the measurement; a policer setting part configured to change a value of a committed burst size of a port sending out more of the packet data at a contracted communication rate to be low based on the statistical information; and a policer function and a shaper function configured to impartially allocate the best-effort bandwidth to each of the ports based on a value of the peak information rate and a minimum bandwidth guarantee rate.

Other objects, features, and advantages of the present invention will be come more apparent from the following detailed description when read in conjunction with the accompanying drawings.

DETAILED DESCRIPTION OF THE PREFERRED EMBODIMENTS

A description is given below, with reference to the FIG. 2 through FIG. 5 of embodiments of the present invention.

Figure 2:
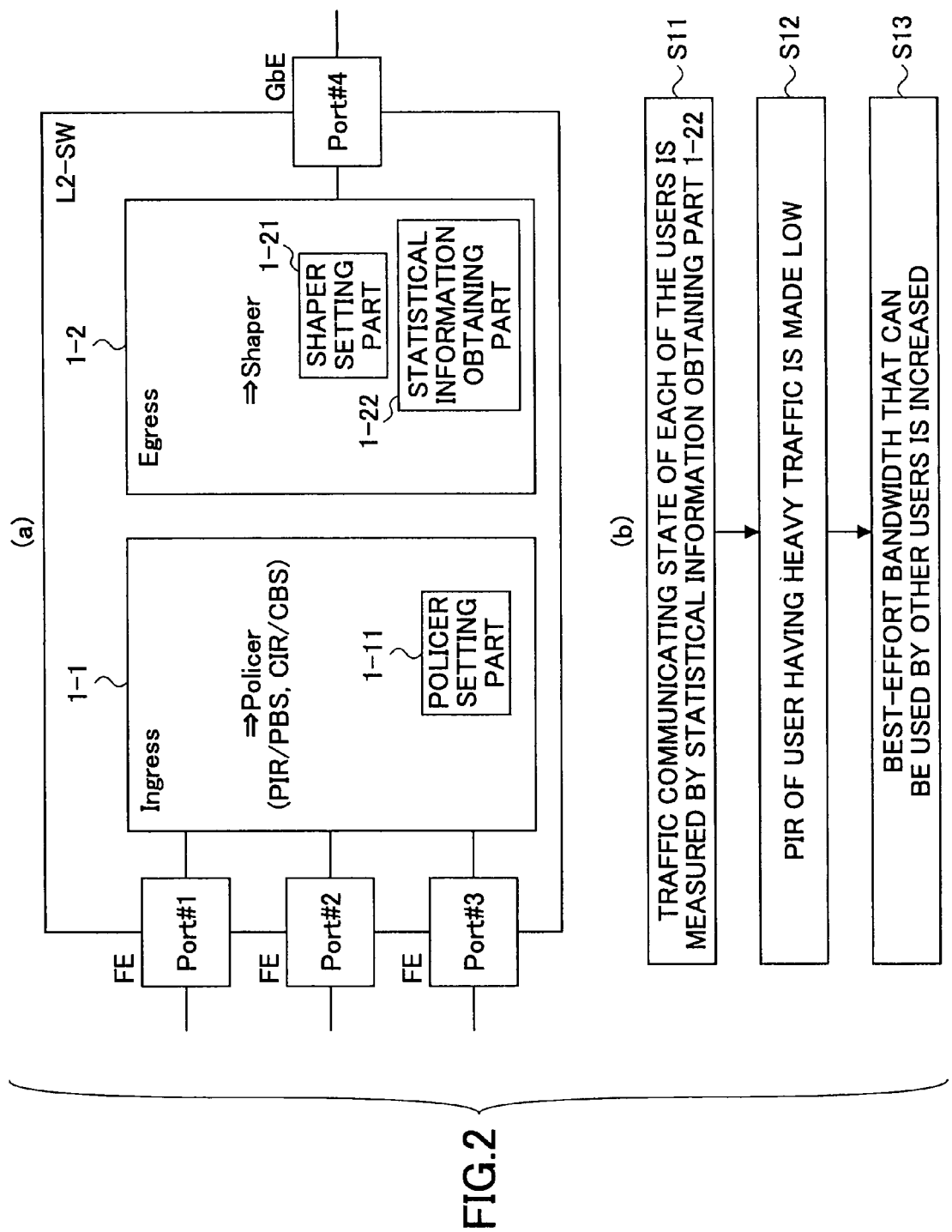
FIG. 2 is a view showing functional blocks and an operation flow of a layer 2 switch of an embodiment of the present invention.

FIG. 2(*a*) is a view showing functional blocks of a layer 2 switch of an embodiment of the present invention. More specifically, FIG. 2(*a*) shows functional blocks of a packet data transferring process in an up direction where packet data input from each of users to each of ports #1 through #3 is output from a port #4 to a host network device. While there is a packet transferring process in a down direction in actual communication, for the convenience of explanation, only the functional blocks of the packet data transferring process in the up direction are shown in FIG. 2.

As shown in FIG. 2(*a*), an ingress part 1-1 has a policer function. The ingress part 1-1, based on setting of a policer setting part 1-11, performs marking of packets arriving at each of the ports. In a case where the packet is equal to or greater than a PIR (Peak Information Rate) setting bandwidth, marking in red (discard) is done.

In a case where the packet is equal to or less than the PIR (Peak Information Rate) setting bandwidth and equal to or greater than a CIR (Committed Information Rate) setting bandwidth, marking in yellow (priority discard) is done. In a case where the packet is equal to less than the CIR (Committed Information Rate) setting bandwidth, marking in green (pass) is done. In addition, narrowing of the bandwidth is done.

An egress part 1-2 has a shaper function. The egress part 1-2 stores a packet received from the ingress part 1-1 in a cue. Based on the result of marking by the ingress part 1-1, the egress part 1-2 controls passing/discarding of the packet by following the setting of the shaper setting part 1-21 so as to output the passing packet from the port #4. From the port #4, the packets being input from each of the ports #1, #2, and #3 are multiplexed and output.

The shaper function of the egress part 1-2 holds a priority discard threshold value. In a case where the traffic of an arrived packet is less than the threshold value, the green packets and the yellow packets are stored in the cue. In a case where traffic of an arrived packet is greater than the threshold value, only the green packet is stored in the cue and the yellow packet is not stored in the cue but discarded. In addition, the shaper function has a priority service control function. For example, in a case where priority service of three classes, high/middle/low, is controlled, a high class packet is output with the greatest priority, and a middle class packet is output with a greater priority than that of a low class packet.

A layer 2 switch of the embodiment of the present invention has a statistical information obtaining part 1-22 provided in the egress part 1-2. The statistical information obtaining part 1-22 measures and stores the amount of out-flowing packet data sent by each of the users. The statistical information obtaining part 1-22, based on the amount of outflow, calculates statistical information reflecting the communications amount during an accounting subject time period such as an average communication amount of a single day of each of the users, for example. The statistical information obtaining part 1-22 feeds back the statistical information to the policer setting part 1-11. The policer setting part 1-11, based on the statistical information, sets the PIR (Peak Information Rate) of each of the users. The PIR (Peak Information Rate) should be greater than the CIR (Committed Information Rate).

In other words, as shown in FIG. 2(*b*), a traffic communicating state of each of the users is measured by the statistical information obtaining part 1-22 in S11, and the PIR (Peak Information Rate) of the user having heavy traffic is made low (down) based on the measurement result in S12. As a result of this, the best-effort bandwidth that can be used by other users is increased in S13.

Figure 3:
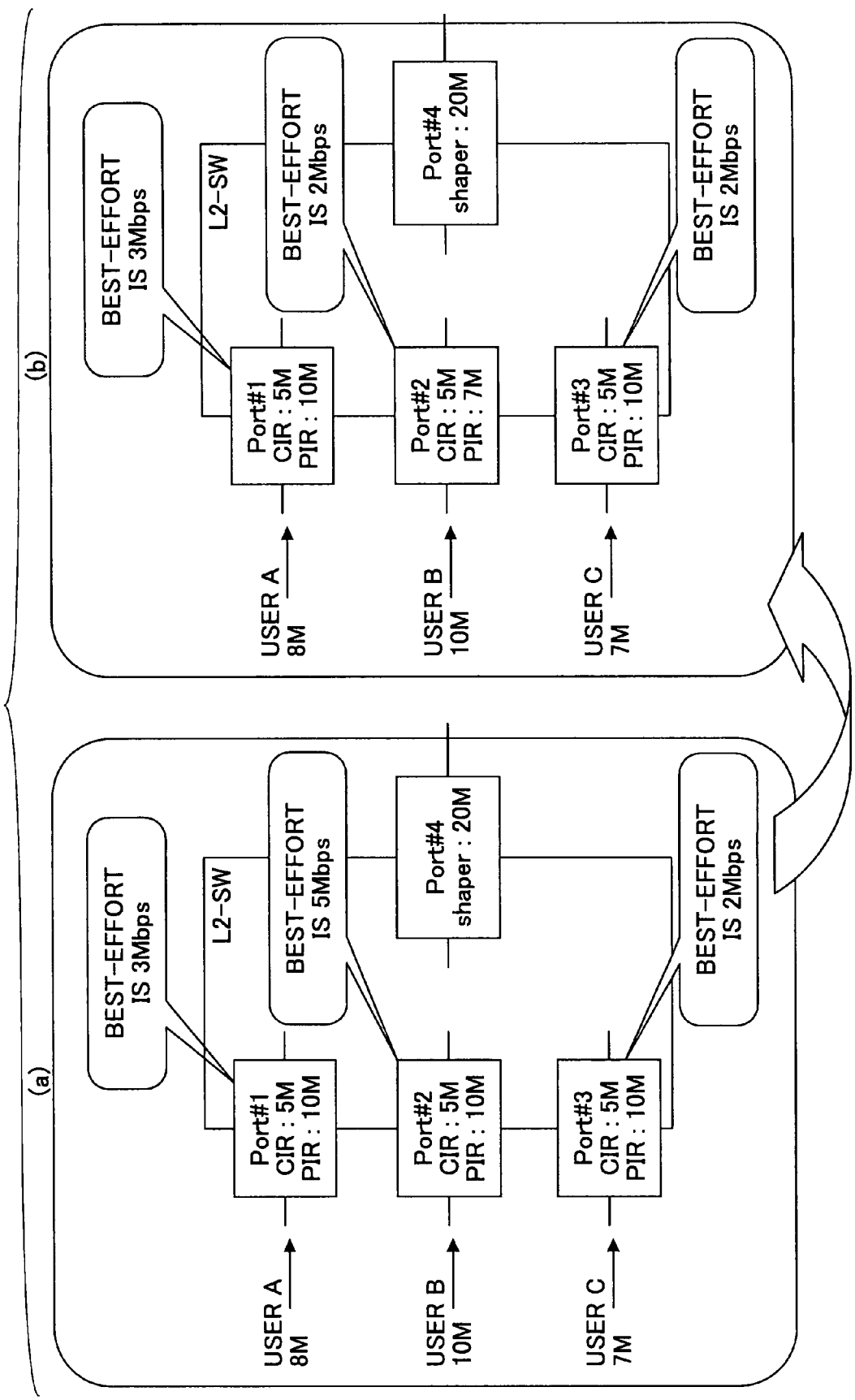
FIG. 3 is a view showing an example of setting a change of a PIR (Peak Information Rate) based on statistical information.

FIG. 3 is a view showing an example of setting a change of the PIR (Peak Information Rate) based on the statistical information.

Figure 1:
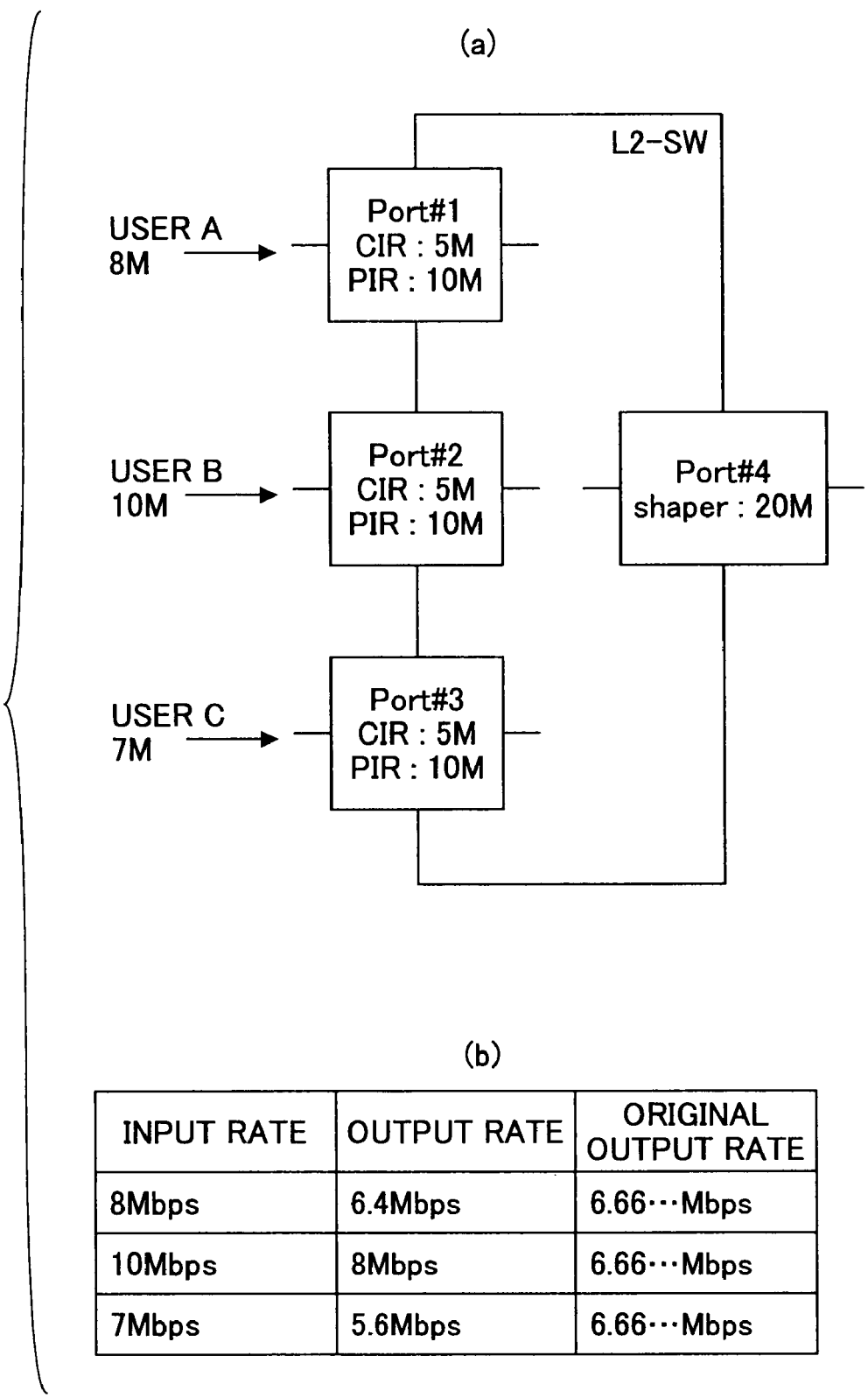
FIG. 1 is a view showing an output rate of a related art bandwidth guarantee and best-effort service.

FIG. 3(*a*) shows a state prior to change of the PIR (Peak Information Rate). In the example shown in FIG. 3(*a*) as well as the example shown in FIG. 1, it is assume that the CIR (Committed Information Rate) of each of the users A, B, and C is 5 Mbps and the PIR (Peak Information Rate) of each of the users A, B, and C is 10 Mbps. It is also assume that the packet data of 8 Mbps, 10 Mbps, and 7 Mbps are output from the user A, the user B, and the user C, respectively.

In this case, the best-effort bandwidth of the user A is 3 (=8−5) Mbps; the best-effort bandwidth of the user B is 5 (=10−5) Mbps; and the best-effort bandwidth of the user C is 2 (=7−5) Mbps.

On the other hand, based on the statistical information of the packet data of each of the users, the PIR (Peak Information Rate) is forced to a lower value, for example "7", for the user B who is a heavy user. As a result of this, as shown in FIG. 3(*b*), the best-effort bandwidth of the user A becomes 3 (=8−5) Mbps; the best-effort bandwidth of the user B becomes 2 (=7−5) Mbps; and the best-effort bandwidth of the user C becomes 2 (=7−5) Mbps. Thus, the bandwidths of the user A and the user C are relatively increased so that the best-effort bandwidths of each of the users are uniform so that the impartial allocation of the best-effort bandwidth can be made.

Figure 4:
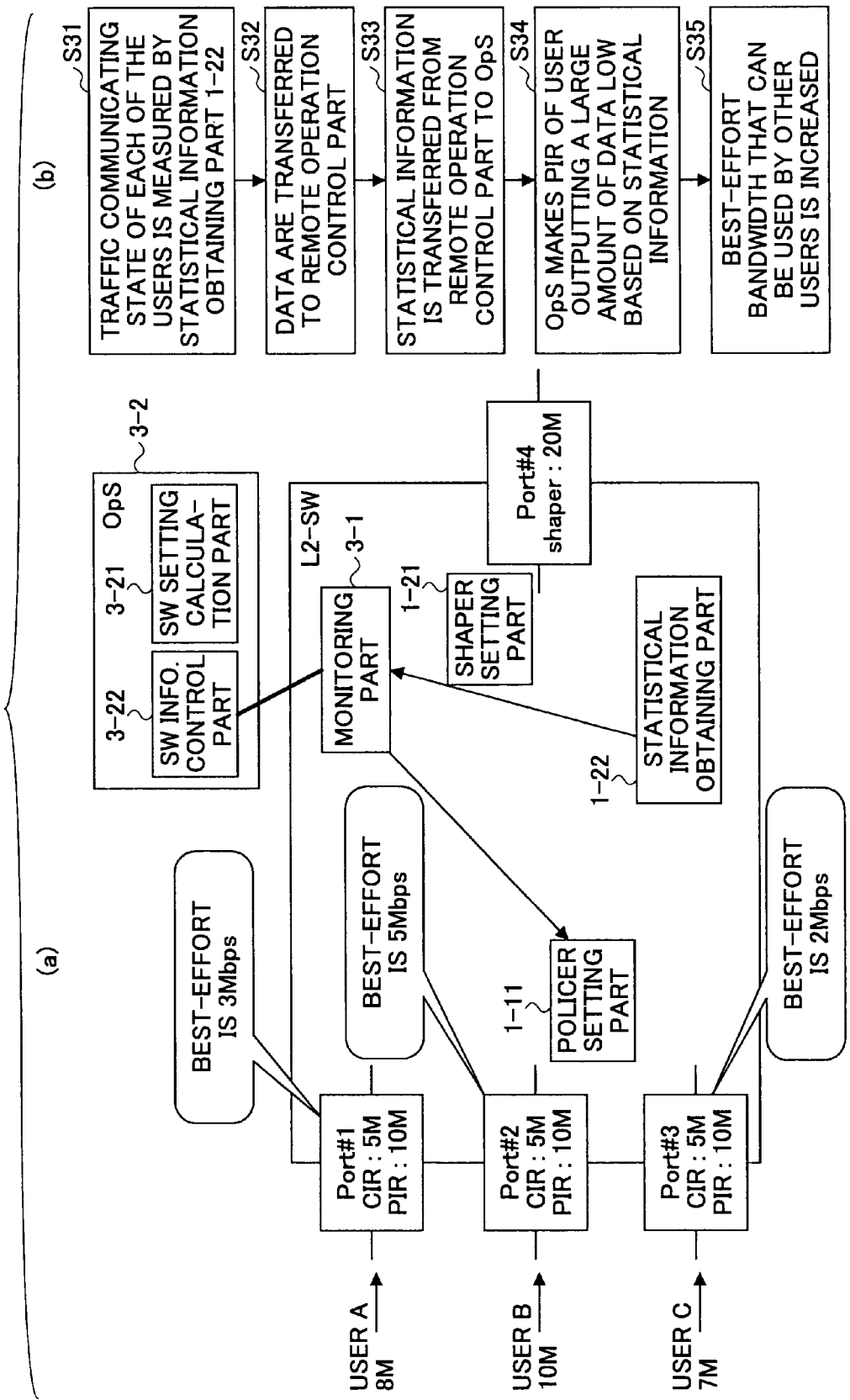
FIG. 4 is a view showing an example of setting the PIR (Peak Information Rate) by an operations system.

FIG. 4 is a view showing an example of setting the PIR (Peak Information Rate) by an operations system. FIG. 4(*a*) shows functional blocks and FIG. 4(*b*) shows an operational flow.

In this example, the traffic communicating state of each of the users is measured in the statistical information obtaining part 1-22 in S31. The data in the layer 2 switch are transferred to a remote monitoring control part 3-1 in S31. The remote monitoring control part 3-1 transfers the measurement result to an operations system (OpS) 3-2 in S33.

The operations system (OpS) 3-2 is a host functional part of the layer 2 switch. The statistical information reflecting the communication amount during the accounting subject time period of each of the users is calculated from the above-mentioned measuring result. A switch information control part 3-22 sends control information to the remote monitoring part 3-1 of the layer 2 switch in order to lower the PIR (Peak Information Rate) of the user B outputting a large amount of data.

The monitoring control part 3-1 controls so that the policer setting part 1-11 sets the PIR (Peak Information Rate) of the user B to be low so that the PIR (Peak Information Rate) of the user B in the monitoring control part 3-1 is set low in S34. As a result of this, the best-effort bandwidth that can be used by other users is increased in S35.

By changing the PBS (Peak Burst Size) or the CBS (Committed Burst Size) in addition to change of the PIR (Peak Information Rate), the best-effort bandwidth can be impartially allocated.

Figure 5:
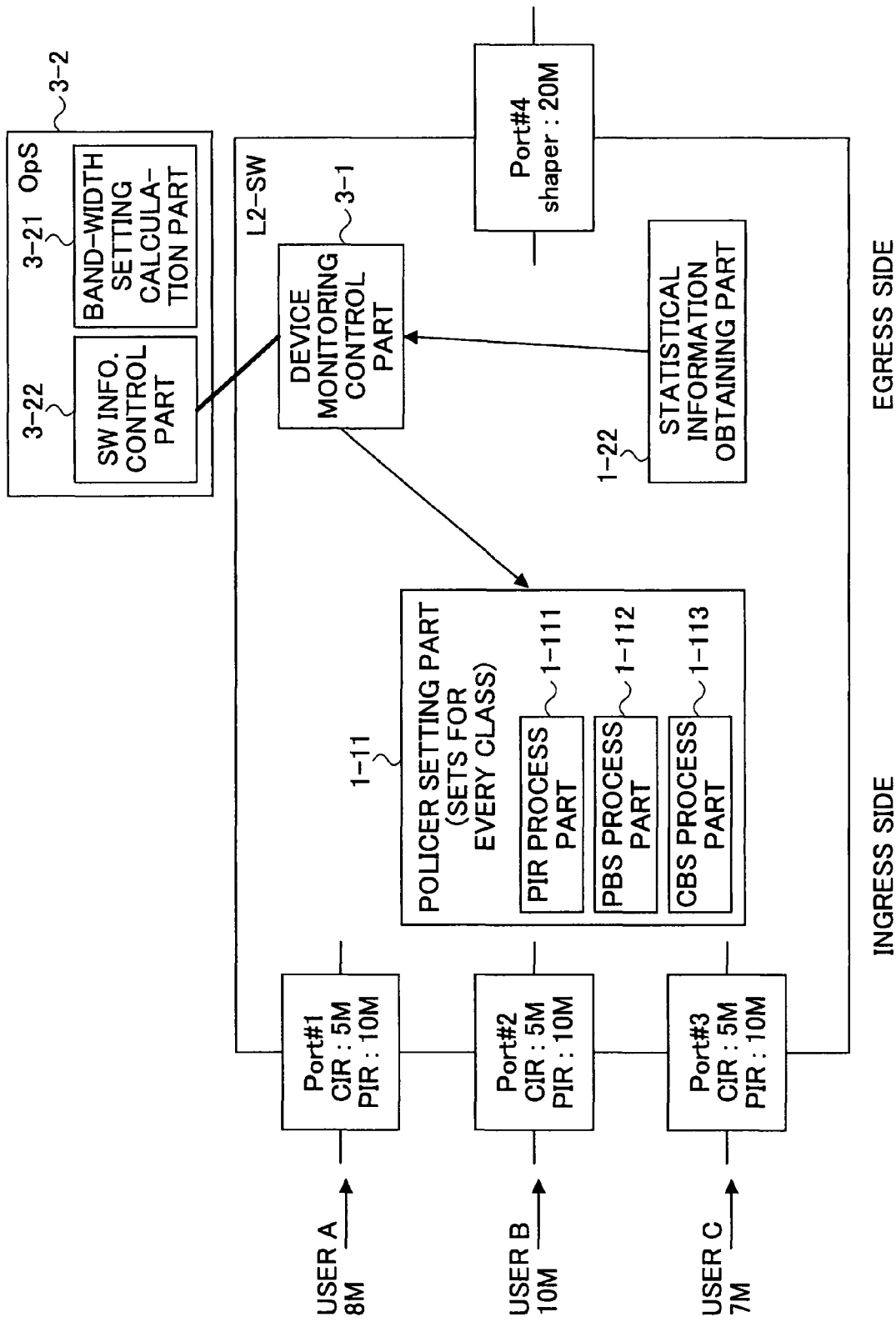
FIG. 5 is a block diagram of a PIR (Peak Information Rate) process part, a PBS (Peak Burst Size) process part, and a CBS (Committed Burst Size) process part of the embodiment of the present invention.

FIG. 5 is a block diagram of a PIR (Peak Information Rate) process part, a PBS (Peak Burst Size) process part, and a CBS (Committed Burst Size) process part of the embodiment of the present invention.

As shown in FIG. 5, the policer setting part 1-11 has a PIR (Peak Information Rate) process part 1-111, a PBS (PIR allowable burst setting value) process part 1-112, and a CBS (CIR allowable burst setting value) process part 1-113. As well as the example shown in FIG. 4, following control information from the operation system 3-2, the PBS (PIR allowable burst setting value) process part 1-112 or the CBS (CIR allowable burst setting value) process part 1-113 is controlled so that the PBS (PIR allowable burst setting value) or the CBS (CIR allowable burst setting value) is controlled.

By making the PBS (PIR allowable burst setting value) of the heavy user low, the packet data exceeding this setting part are discarded. Hence, allocation of the best-effort bandwidth to the heavy user is relatively decreased so that the impartial allocation to each of the users can be performed.

Similarly, by making the CBS (CIR allowable burst setting value) of the heavy user low, the packet data exceeding this setting part are discarded. Hence, allocation of the best-effort bandwidth to the heavy user is relatively decreased so that the impartial allocation to each of the users can be performed.

By combining in a complex manner the change of the PIR (Peak Information Rate), the PBS (PIR allowable burst setting value), and the CBS (CIR allowable burst setting value), allocation of the best-effort bandwidth to the heavy user is relatively decreased so that the impartial allocation to each of the users can be performed.

It may be change control of the PIR (Peak Information Rate) by which the PIR (Peak Information Rate) of the user sending the most packet data is changed so that the best-effort bandwidth of the user sending the most packet data becomes a half of that at the normal time and the PIRs (Peak Information Rate) of the other users are returned to an original normal time (at the time of making a contract).

It may be change control of the PBS (PIR allowable burst setting value) by which the PBS (PIR allowable burst setting value) of the user sending the most packet data is changed so that the best-effort bandwidth of the user sending the most packet data becomes a half of that at the normal time and the PBSs (PIR allowable burst setting value) of the other users are returned to an original normal time.

It may be change control of the CBS (CPIR allowable burst setting value) by which the CBS (CPIR allowable burst setting value) of the user sending the most packet data is changed so that the best-effort bandwidth of the user sending the most packet data becomes a half of that at the normal time and the CBSs (CIR allowable burst setting value) of the other users are returned to an original normal time.

In addition, the ratio of the best-effort bandwidth used by each of the users is calculated from the communication amount of the packet data. The bandwidth where an inverse number of the ratio is multiplied by the present best-effort bandwidth is used as a new best-effort bandwidth so that the PIR (Peak Information Rate), the PBS (PIR allowable burst setting value), or the CBS (CIR allowable burst setting value) is set and the best-effort bandwidth that can be used by each of the users can be uniform.

In the above-discussed embodiment, a case where each of the users A, B, and C pays the same amount of contract money under the same conditions for the CIR (Committed Information Rate) and the PIR (Peak Information Rate) is explained. However, in a case where each of the users A, B, and C pays a different amount of contract money under different conditions, the PIR (Peak Information Rate), the PBS (PIR allowable burst setting value), or the CBS (CIR allowable burst setting value) can be set so that the best-effort bandwidth can be allocated corresponding to the contract fee of each of the users.

In addition, based on the request from each of the users, the amount of the packet data that can pass through while the PIR (Peak Information Rate) setting value and others are high for a designated time period may be set large. After the designated time period passes, for achieving impartiality with other users, an additional service whereby the PIR (Peak Information Rate) setting value and others are returned to the normal value may be performed. Because of this, it is possible to implement precise communication service corresponding to the demands of the users.

In addition, regarding the packet data from each of the users, the sending amount of the packets of the best-effort bandwidth is measured for each priority class; statistical information of the traffic for every priority class is calculated based on the measured amount; and the statistical information is fed back to the PIR process part for priority class, so that the best-effort bandwidth corresponding to the priority class can be allocated to the packet data of each of the users.

Allocation of the best-effort bandwidth corresponding to the priority class can be implemented by not only feed back to the PIR (Peak Information Rate) setting value process part 1-111 but also feed back to the PBS (PIR allowable burst setting value) process part 1-112 or the CBS (CIR allowable burst setting value) process part 1-113.

The present invention is not limited to these embodiments, but variations and modifications may be made without departing from the scope of the present invention.

Thus, according to the above-discussed embodiment of the present invention, it is possible to provide a best-effort bandwidth allocating method, including the steps of: measuring sending amounts of packet data that are input from each of ports providing minimum bandwidth guarantee type and best-effort type communication service; calculating statistical information corresponding to an accounting subject time period of the sending amounts of the packet data of the best-effort bandwidth of each of the ports, based on the result of the measurement; changing a value of a peak information rate of a port sending out more of the packet data at a contracted communication rate to be low based on the statistical information; and impartially allocating the best-effort bandwidth to each of the ports based on the value of the peak information rate and a minimum bandwidth guarantee rate.

According to the above-discussed embodiment of the present invention, it is also possible to provide a best-effort bandwidth allocating device, including: a statistical information obtaining part configured to measure sending amounts of packet data that are input from each of ports providing minimum band-width guarantee type and best-effort type communication service, and to calculate statistical information corresponding to an accounting subject time period of the sending amounts of the packet data of the best-effort bandwidth of each of the ports, based on the result of the measurement; a policer setting part configured to change a value of a peak information rate of a port sending out more of the packet data at a contracted communication rate to be low based on the statistical information; and a policer function and a shaper function configured to impartially allocate the best-effort bandwidth to each of the ports based on the value of the peak information rate and a minimum bandwidth guarantee rate.

According to the above-discussed embodiment of the present invention, it is also possible to provide a best-effort bandwidth allocating device, including: a statistical information obtaining part configured to measure sending amounts of packet data that are input from each of ports providing minimum bandwidth guarantee type and best-effort type communication service, and to calculate statistical information corresponding to an accounting subject time period of the sending amounts of the packet data of the best-effort bandwidth of each of the ports, based on the result of the measurement; a policer setting part configured to change a value of a peak burst size of a port sending out more of the packet data at a contracted communication rate to be low based on the statistical information; and a policer function and a shaper function configured to impartially allocate the best-effort bandwidth to each of the ports based on a value of the peak information rate and a minimum bandwidth guarantee rate.

According to the above-discussed embodiment of the present invention, it is also possible to provide a best-effort bandwidth allocating device, including: a statistical information obtaining part configured to measure sending amounts of packet data that are input from each of ports providing minimum bandwidth guarantee type and best-effort type communication service, and to calculate statistical information corresponding to an accounting subject time period of the sending amounts of the packet data of the best-effort bandwidth of each of the ports, based on the result of the measurement; a policer setting part configured to change a value of a committed burst size of a port sending out more of the packet data at a contracted communication rate to be low based on the statistical information; and a policer function and a shaper function configured to impartially allocate the best-effort bandwidth to each of the ports based on a value of the peak information rate and a minimum bandwidth guarantee rate.

According to the above-mentioned best-effort bandwidth allocating method or device, the statistical information corresponding to the accounting subject time period of the sending amounts of the packet data sent out from each of the ports corresponding to the users is obtained. Based on the statistical information, the value of a peak information rate, the peak burst size, or the committed burst size of the port sending out the most packet data is set low, so that the output rate of the port is decreased and the number of discarded packets of the port sending out a large amount of the packet data is increased. As a result of this, the packet data of other users pass so that the impartial best-effort bandwidth corresponding to the contracted communication rate can be allocated to each of the users.

In addition, conventionally there is only the service fee based on the minimum bandwidth guarantee rate. However, according to the above-mentioned embodiment, a service fee system including the setting value of the peak information rate is applied so that the best-effort bandwidth corresponding to the setting value of the peak information rate corresponding to the service fee can be allocated. Thus, it is possible to allocate precise and impartial best-effort bandwidth to the users.

This patent application is based on Japanese Priority Patent Application No. 2006-263765 filed on Sep. 28, 2006, the entire contents of which are hereby incorporated by reference.

What is claimed is:

1. A best-effort bandwidth allocating method, comprising:
measuring sending amounts of packet data that are input from each of ports providing minimum bandwidth guarantee type and best-effort type communication service;
calculating statistical information corresponding to an accounting subject time period of the sending amounts of the packet data of the best-effort bandwidth of each of the ports, based on the result of the measurement;
changing a value of a peak information rate of a port sending out more of the packet data at a contracted communication rate to be low based on the statistical information; and
impartially allocating the best-effort bandwidth to each of the ports based on the value of the peak information rate and a minimum bandwidth guarantee rate,
wherein the result of the measurement of the sending amounts of the packet data input from each of the ports is reported to a host operations system; and
the peak information rate of each of the ports is changed based on the statistical information reflecting average communication amounts during the accounting subject time period of the sending amounts of the packet data of the best-effort bandwidth for every port calculated by the host operations system.

2. A best-effort bandwidth allocating device, comprising:
a statistical information obtaining part configured to measure sending amounts of packet data that are input from each of ports providing minimum band-width guarantee type and best-effort type communication service, and to calculate statistical information reflecting average communication amounts during an accounting subject time period of the sending amounts of the packet data of the best-effort bandwidth of each of the ports, based on the result of the measurement;
a policer setting part configured to change a value of a peak information rate of a port sending out more of the packet data at a contracted communication rate to be low based on the statistical information; and
a policer function and a shaper function configured to impartially allocate the best-effort bandwidth to each of the ports based on the value of the peak information rate and a minimum bandwidth guarantee rate,
wherein the result of the measurement of the sending amounts of the packet data input from each of the ports is reported to a host operations system; and
the peak information rate of each of the ports is changed based on the statistical information corresponding to the accounting subject time period of the sending amounts of the packet data of the best-effort bandwidth for every port calculated by the host operations system.

3. A best-effort bandwidth allocating device, comprising:
a statistical information obtaining part configured to measure sending amounts of packet data that are input from each of ports providing minimum bandwidth guarantee type and best-effort type communication service, and to calculate statistical information corresponding to an accounting subject time period of the sending amounts of the packet data of the best-effort bandwidth of each of the ports, based on the result of the measurement;
a policer setting part configured to change a value of a peak burst size of a port sending out more of the packet data at a contracted communication rate to be low based on the statistical information; and
a policer function and a shaper function configured to impartially allocate the best-effort bandwidth to each of the ports based on a value of the peak information rate and a minimum bandwidth guarantee rate,
wherein the result of the measurement of the sending amounts of the packet data input from each of the ports is reported to a host operations system; and
the peak information rate of each of the ports is changed based on the statistical information reflecting average communication amounts during the accounting subject time period of the sending amounts of the packet data of the best-effort bandwidth for every port calculated by the host operations system.

4. A best-effort bandwidth allocating device, comprising:
a statistical information obtaining part configured to measure sending amounts of packet data that are input from each of ports providing minimum bandwidth guarantee type and best-effort type communication service, and to calculate statistical information corresponding to an accounting subject time period of the sending amounts of the packet data of the best-effort bandwidth of each of the ports, based on the result of the measurement;
a policer setting part configured to change a value of a committed burst size of a port sending out more of the packet data at a contracted communication rate to be low based on the statistical information; and
a policer function and a shaper function configured to impartially allocate the best-effort bandwidth to each of the ports based on a value of the peak information rate and a minimum bandwidth guarantee rate,
wherein the result of the measurement of the sending amounts of the packet data input from each of the ports is reported to a host operations system; and
the peak information rate of each of the ports is changed based on the statistical information reflecting average communication amounts during the accounting subject time period of the sending amounts of the packet data of the best-effort bandwidth for every port calculated by the host operations system.

* * * * *